United States Patent [19]
Gordon

[11] 3,982,696
[45] Sept. 28, 1976

[54] JET NOISE SUPPRESSOR NOZZLE

[75] Inventor: Walter R. Gordon, Savannah, Ga.

[73] Assignee: Grumman American Aviation Corporation, Savannah, Ga.

[22] Filed: July 1, 1975

[21] Appl. No.: 592,218

[52] U.S. Cl. ...................... 239/265.17; 181/33 HC; 239/265.37; 239/DIG. 7
[51] Int. Cl.² .......................................... B64D 33/06
[58] Field of Search ................. 239/265.13, 265.17, 239/265.33, DIG. 7, 265.37; 181/33 HC, 43, 51

[56] References Cited
UNITED STATES PATENTS

| | | | |
|---|---|---|---|
| 3,048,975 | 8/1962 | Keen | 181/33 HC |
| 3,065,818 | 11/1962 | Lombard et al. | 181/33 HC |
| 3,174,582 | 3/1965 | Duthion et al. | 181/33 HC |
| 3,463,402 | 8/1969 | Langston, Jr. | 239/265.13 |

*Primary Examiner*—Evon C. Blunk
*Assistant Examiner*—Michael Mar
*Attorney, Agent, or Firm*—Richard G. Geib; Mellor A. Gill

[57] ABSTRACT

A jet noise suppressor nozzle comprised of a plurality of chute flow dividers through which air passes to mix with the jet gases at the boundaries formed by the downstream ends of the chute and the terminal plane of the nozzle with a plate at the forward area of the chute inlets under which jet gases are exhausted so as to create the aforementioned flow by the Coanda effect on the boundary layer air around the nozzle over the plate.

10 Claims, 8 Drawing Figures

JET NOISE SUPPRESSOR NOZZLE

As may be readily appreciated the noise associated with the operation of a jet engines results from the flow through the atmosphere of the high velocity, high temperature, exhaust gas which is discharged from the engine. Attempts to solve this problem of jet engine noise have resulted in nozzle structures that are provided with flush inlet scoops so that slipstream air will flow into and through the chutes to lessen the temperature and velocity of the exhaust gas.

It has been found however, that the flow through the chute is problematical at best in view of the turbulence within the chute. Therefore, several attempts were noted in the prior art such as shown by U.S. Pat. No. 3,002,241 and 3,065,818. In the former of these the stated object was to provide bleed ports in the walls of the chutes deep within the chute to serve as ejector pumps to increase the rate of air movement. In the latter the object was to provide guide vanes across the inlet of the chute which would project into the boundary layer air around the nozzle so as to direct such air into for flow through and out downstream ends of the chutes.

Neither of these prior art attempts were believed to be too particularly successful in that they were not directed to capturing the higher velocity boundary layer air around the nozzle so that it could overcome the turbulence within the chute. Actually in the former of the prior art patents aforementioned a stated object of the bleed port is to create a turbulence with the chute over and above that which could be expected by the flow of the boundary layer air therethrough. Any turbulence within the chute will appear as a dam to the low velocity innermost layer of boundary layer air whereby the boundary layer air will pass the flush inlet by, rather than turn into the chute.

It is therefore a principle object of this invention to provide a means at the flush inlet for energizing the boundary layer air to flow into the chute at a velocity sufficient to overcome any turbulence within the chute so that it may be exhausted to improve the ratio of area of the jet engine exhaust gases to the area of the atmospheric mixing air.

A more particular object of this invention is in the utilization of the Coanda effect on the boundary layer stream to turn same inwardly such that the higher velocity boundary layer region spaced from the engine structure may be attached to the surface and utilized to insure flow through the chutes.

A still more particular object of this invention is to provide for a jet engine sound suppression nozzle having a plurality of air mixing chutes with a plate at a forwardmost area of a flush inlets into the chutes that is gradually bent downwardly into the chutes and under which there is exhausted jet engine gases obtained by bleed slots or bleed jet pipes to flow therefrom via a nozzle created by the plate and a chute wall to provide the Coanda effect for drawing boundary layer air about the nozzle through the chutes.

A still further object to this invention is to provide for a jet engine nacelle structure, having a jet gas sound suppression nozzle behind structure of a greater diameter, a means to pull the boundary layer air over the structure of greater diameter down the step to the nozzle therebehind and into the chutes to flow therefrom for silencing of the jet engine exhaust gases as they emerge.

DRAWING DESCRIPTION

FIG. 3 is an illustration of prior art jet engine sound suppression nozzle;

DETAIL DESCRIPTION

Figure 1:
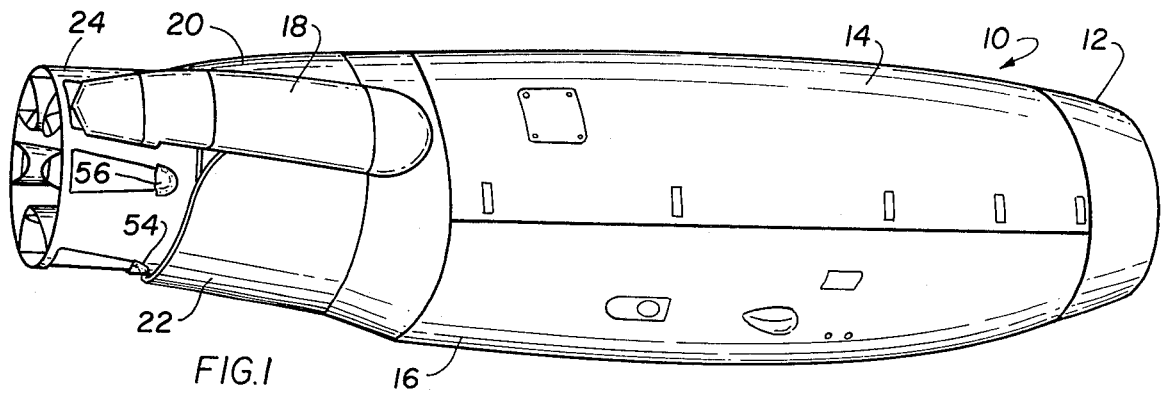
FIG. 1 is a isometric illustration of a jet engine nacelle incorporating a sound suppression nozzle in accordance with this invention.

With more particular reference to FIG. 1 there is shown a nacelle 10 for enclosing an engine. The nacelle 10 has provisions for an inlet fairing 12 and access doors 14 and 16. Stangs 18 (one of which is shown) are fixed to the nacelle and carry actuating mechanism for thrust reverser doors 20 and 22. A sound suppression nozzle 24 extends rearwardly from the nacelle structure.

Figure 2:
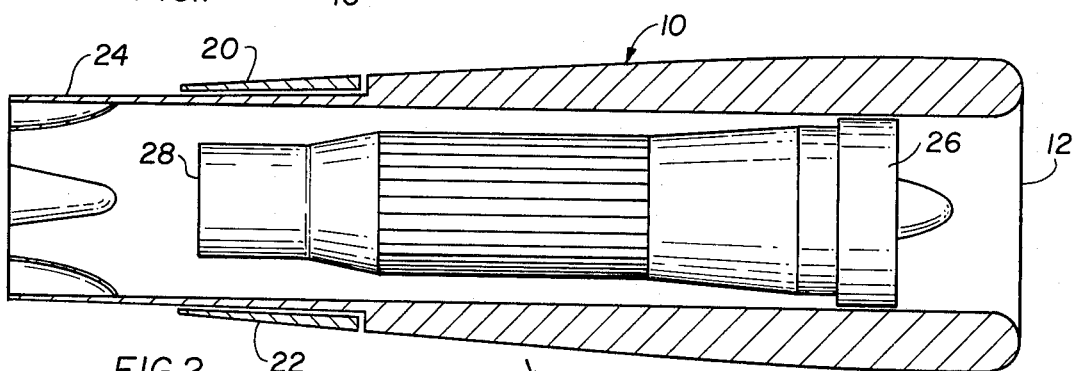
FIG. 2 is a schematic illustration of the nacelle of FIG. 1 in cross section with a jet engine therewithin.

This apparatus is schematically illustrated by FIG. 2 showing the nacelle 10 about a fan jet engine such that the exhaust from the fan 26 is comingled with the exhaust from the jet engine outlet 28 ahead of the sound suppression nozzle 24.

With reference not to FIG. 3 there shown a sound suppression nozzle of 30 of a prior art type having a plurality of flush inlets 32 for chutes 34 within which there is a fairing plate 36 to provide an insulating space 38 between the innermost wall of the chutes 34 and the fairing 36.

The engine nacelle structure 40 terminates just ahead of the sound suppression nozzle 30 to create a step 42 inwardly at the juncture. Thrust reverser doors, such as the doors 20 and 22 of FIGS. 1 and 2 are normally nested within the nacelle structure so as to further deepen the step 42 in its interruption of the streamline flow of boundary layer air from the inlet of the nacelle.

It has been found that the flow of boundary layer air into and through the chute 38 is a function of the length "a" in the horizontal direction of the chute, depth "b" the depth of the chute into the exhaust nozzle, the angle $\alpha$ of the boundary layer with the jet exhaust axis and the change of angle between the angle $\theta$ of air exhausted by the chute with respect to said axis and the angle $\alpha$ in establishing the penetration of the flow through the chute into the jet exhaust steam at high thrust powers.

With this understanding one may then realize that the penetration factor of the air from the chutes is a ratio of the nozzle diameter to the effective core diameter and nozzle design must, therefore, take into account cruise performance criteria to minimize engine performance losses in accomplishing beneficial sound suppression.

Figure 4:
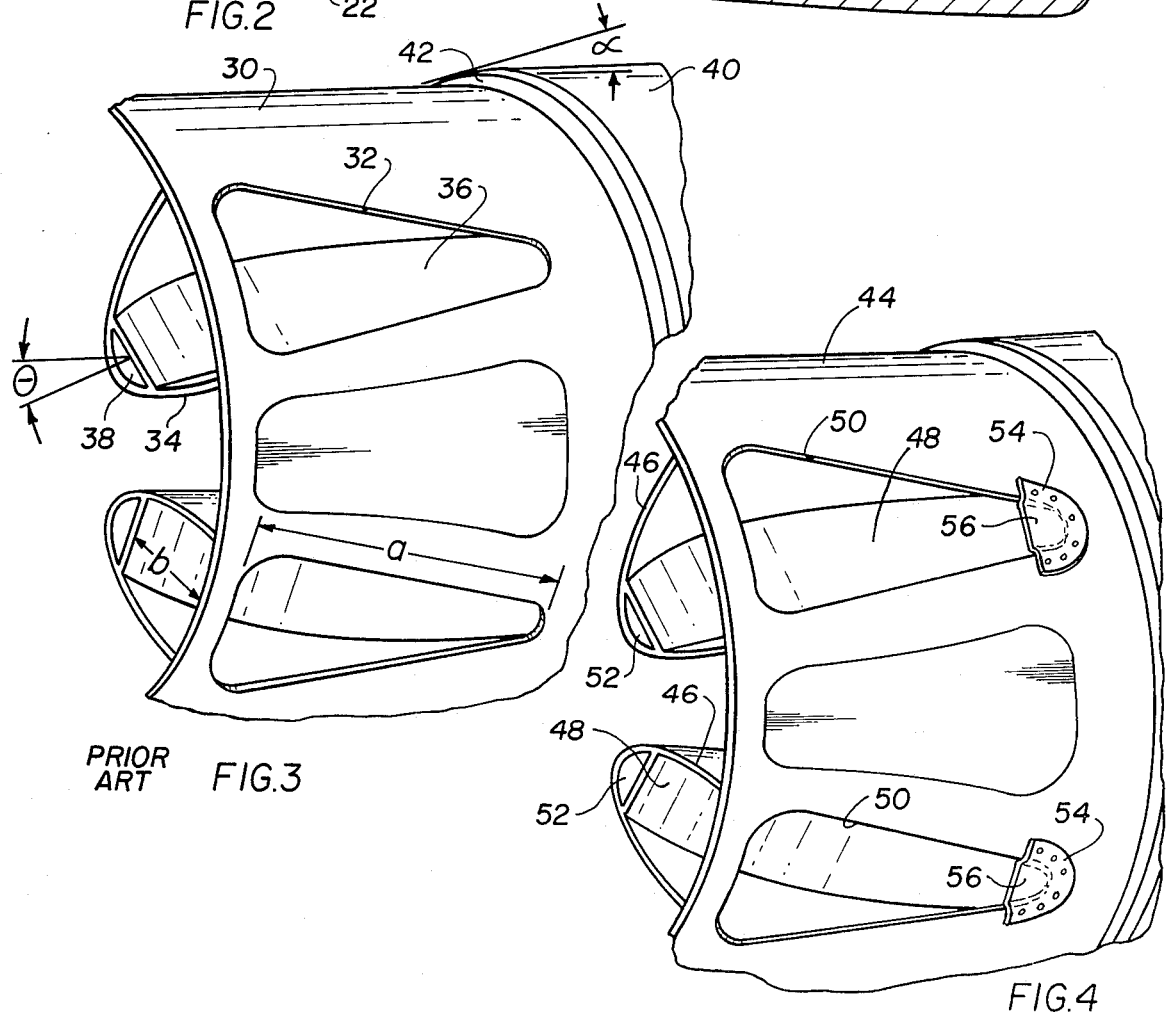
FIG. 4 is an illustration of a jet engine sound suppression nozzle incorporating features of this invention.
Figure 5:
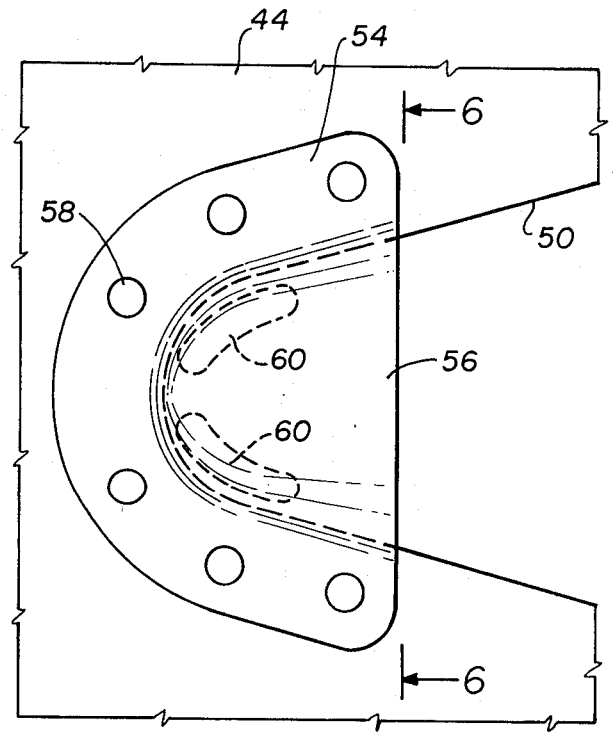
FIG. 5 is a partial section of a plan view of the jet engine sound suppression nozzle at a forwardmost area of the chute inlet.
Figure 6:
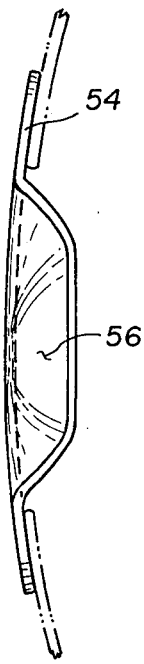
FIG. 6 is an end view of plate taken along lines 6—6 of FIG. 5.
Figure 7:
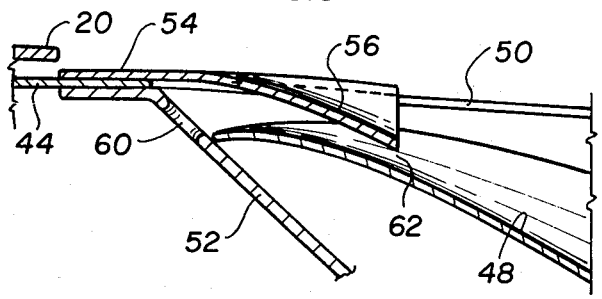
FIG. 7 is a cross sectional sideview of the jet engine nacelle at the forwardmost area of the flush inlet of the chute.
Figure 8:
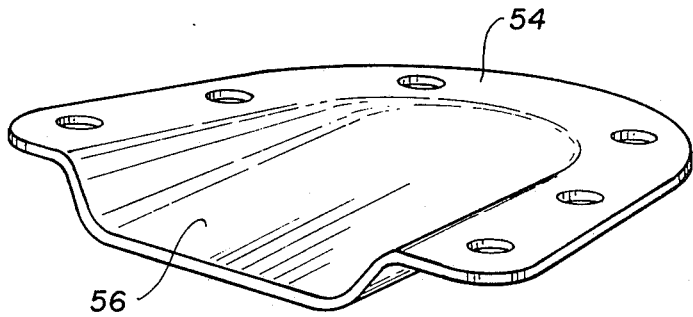
FIG. 8 is an isometric view of a plate to be used with the chute of a sound suppression nozzle in accordance with this invention.

It has been found with the structure of this invention that an improvement in sound suppression may be accomplished without loss in engine performance with the structure shown by FIG. 4. More particularly, sound suppressor nozzle 44 is, as with the nozzle 30 of FIG. 3, provided with a plurality of chutes 46 (five in number being found appropriate). In the chutes are fairings 48 curving downwardly and outwardly from flush inlets 50 in the outer nozzle wall to provide insulating space 52 thereunder between the fairing 58 and the inner wall of the chute 46. At the forwardmost area of the chute flush inlet 50 plates 54 are attached which have a downwardly directed ramp surface 56 to transition the plane of the nozzle 44 to the plane of the fairings 48. The plates may be located at the forwardmost area of the flush inlet 50 by means of the plurality of rivets 58 (see FIG. 5). Under the plates 54 the chute wall structure 52 is slotted as at 60 to open the area between plate 54 and the fairing 48 to the jet engine exhaust gases. The plate 54 with its ramp surface 56 provides a nozzle 62 of elongated nature at the inlet to the chute.

OPERATION

In operation whenever the jet engine is functioning the exhaust gases will flow via the nozzle 60 under the ramp 56 to be exhausted, as a choked nozzle, via nozzle 62 into the chute above the fairing 48. This will create a Coanda effect to attach the boundary layer air to the ramp 56 to increase the angle of entry of the approaching air so that it will increase the penetration factor of the boundary layer air into the jet exhaust at the nozzle terminal plane. By increasing the angle the high velocity boundary layer air more remote from the nacelle structure 10 will be caused to flow into the through the chutes which will overcome any turbulence dam in the chutes.

This invention has allowed the change from a six chute design to a five chute design whereby engine performance characteristics have been improved as well as sound suppression. Having described an operative embodiment of this invention, it is now desired to set forth the protection sought by these Letters Patent in the appended claims as follows:

I claim:

1. In a jet engine exhaust nozzle through which thrust gas of an engine is discharged and about which flows a boundary layer stream which nozzle has at least one flush inlet for at least one chute extending inwardly through the wall thereof, a means to direct said stream into and through said chute, said means comprising:
    a ramp at a leading edge of the flush inlet, said ramp extending aft over a portion of the chute and terminating in an edge above the chute and within the chute aft of the inlet; and,
    means to direct a portion of the thrust gases of the engine under the ramp to emerge under the edge thereof within the chute aft of the inlet.

2. The structure of claim 1 wherein said ramp provides a surface flush with the nozzle at the inlet which surface gradually diverges from a plane of the nozzle to a plane at an angle therewith.

3. The structure of claim 2 wherein the chute has an inner wall projecting into the nozzle to divide the thrust gas into a plurality of separate streams about a core thereof, said wall cooperating with said ramp to form a choked nozzle therebetween for the portion of thrust gases under the ramp.

4. The structure of claim 3 wherein the choked nozzle is wider than it is deep so as to maximize the Coanda effect over the total surface of said ramp.

5. In a jet engine exhaust nozzle through which thrust gas of an engine is discharged and about which flows a boundary layer stream which nozzle has at least one flush inlet for at least one chute extending through the wall thereof with the inlet elongated from a narrow forward opening area to a wider aft opening area through the nozzle wall to provide an inner wall of streamlined form for the chute that widens and deepens into the nozzle for the thrust gas, a means to direct said stream into the chute, said means comprising:
    a ramp at the leading edge of the flush inlet, said ramp extending aft over a portion of the chute thereof such that said ramp is at the narrow forward opening area and curving downwardly into the chute to form a flat choked nozzle with the inner wall; and
    means to direct a portion of the thrust gases under the ramp to emerge in the chute through the choked nozzle.

6. The structure of claim 5 wherein the inner wall has slots to communicate and provide the means to direct a portion of the thrust gases of the engine under the ramp.

7. The structure of claim 6 wherein there is further provided a fairing plate between the inner wall and the ramp with the slots in the inner wall above the plate and under the ramp such that thrust gases will be exhausted via a choked nozzle formed by the plate and ramp from the area of the slots to the end of the ramp.

8. The structure of claim 1 wherein the nozzle is behind and inward of thrust reverser doors faired into nacelle structure about a jet engine whereby the boundary layer stream along the nacelle is above the nozzle a finite distance and pulled into the chute by a Coanda effect on the ramp created by said means to direct a portion of the thrust gases of the engine under the ramp.

9. A jet engine exhaust silencer comprising:
    a engine nacelle structure, said structure having faired thereto thrust reverser doors operatively supported by stangs of said structure to be in an inoperative position stowed intermediate the structure and in an operative position behind the structure;
    a silencer nozzle at the rear of said nacelle structure between the stowed position and the operative position of said doors, said nozzle of lesser diameter than the inside diameter of said doors to permit said doors to move aft therover, said nozzle having a plurality of chutes increasing in depth towards the aft end of the nozzle in the area just ahead of the operative position of the doors with said chutes being open by flush inlets through the exterior wall of said nozzle adjacent aft edges of the doors in their stowed position and inward of same whereby the surrounding boundary layer will be available for said chutes as it leaves said doors to increase the peripheral contact of ambient air with exhaust gas flow in said chutes; and
    means to draw boundary layer air into for flow through said chutes, said means including, a ramp continuation of the nozzle wall at the forwardmost area of said inlet, said ramp being a plate across the forwardmost portion of the flush inlet that curves gradually into the depth of said chute to terminate with an edge below the flush inlet, and means to bleed a portion of the exhaust gas flow from the area within said nozzle to the area within said chutes emerging under said plate to flow via a restricted nozzle formed by the edge of the plate and a portion of the chutes thereunder away from the edge such that a Coanda effect on the boundary layer air will increase the velocity of the inner layers to aid in turning the boundary layer into and through the chutes.

10. A jet nozzle comprising in combination; a duct adapted to receive an axial flow of gas, said duct having longitudinal corrugations radially distributed within the duct, the depth of the corrugations increasing in the direction of the axial flow of gas, said corrugations having an inlet in the wall of the duct and an opening in the direction of the axial flow of gas connected by a wall having an inner partition through which there is a communication to the axial flow of gas, said communication being adjacent and under the forward edge of said inlet; and a plate member on said duct extending across a portion of the inlet above the communication through the inner partition, said plate continuing into the corrugation from the inlet along a gradually curving line toward said partition forming a nozzle for said gas directed by said plate and partition so as to emerge adjacent the terminal edge of the plate in the corrugations whereby boundary layer air will be drawn in by a Coanda effect for flow through said corrugations.

* * * * *